US00RE41620E

(19) United States
(12) Reissued Patent
Scillia et al.

(10) Patent Number: US RE41,620 E
(45) Date of Reissued Patent: Sep. 7, 2010

(54) CHALK LINE WITH VIEWING WINDOW

(75) Inventors: Robert Scillia, West Hartford, CT (US); Vincent Cook, Milford, CT (US)

(73) Assignee: The Stanley Works, New Britain, CT (US)

(21) Appl. No.: 11/819,165

(22) Filed: Jun. 25, 2007

Related U.S. Patent Documents

Reissue of:
(64) Patent No.: 6,915,587
Issued: Jul. 12, 2005
Appl. No.: 10/736,606
Filed: Dec. 17, 2003

(51) Int. Cl.
*B44D 3/38* (2006.01)

(52) U.S. Cl. ..... 33/414
(58) Field of Classification Search ..... 33/414
See application file for complete search history.

(56) References Cited

U.S. PATENT DOCUMENTS

| | | | | | |
|---|---|---|---|---|---|
| 627,057 | A | * | 6/1899 | Gavin | 33/414 |
| 665,119 | A | * | 1/1901 | Latter | 33/414 |
| 1,364,031 | A | * | 12/1920 | Brenizer | 242/395.1 |
| 1,557,031 | A | * | 10/1925 | Conway | 33/414 |
| 1,567,976 | A | * | 12/1925 | Myers | 33/414 |
| 1,653,191 | A | | 12/1927 | Savage | 33/414 |
| 3,046,663 | A | | 7/1962 | Romero | 33/354 |
| 3,309,774 | A | | 3/1967 | Cloutier | 33/332 |
| 3,888,010 | A | * | 6/1975 | Hyde et al. | 33/414 |
| 4,606,134 | A | * | 8/1986 | Flick | 33/414 |
| 4,768,290 | A | * | 9/1988 | Cooper | 33/756 |
| 4,819,337 | A | * | 4/1989 | Noyes | 33/414 |
| 4,844,373 | A | * | 7/1989 | Fike, Sr. | 242/588.1 |
| 4,926,562 | A | * | 5/1990 | Hwu | 33/414 |
| 5,493,787 | A | * | 2/1996 | Owens | 33/414 |
| 5,509,616 | A | * | 4/1996 | Millen et al. | 242/381.5 |
| 5,644,852 | A | | 7/1997 | Fuller et al. | 33/414 |
| 6,079,112 | A | * | 6/2000 | Love | 33/414 |
| 6,098,299 | A | * | 8/2000 | Collins et al. | 33/414 |
| 6,289,597 | B1 | * | 9/2001 | Beyers | 33/414 |
| 6,345,448 | B1 | * | 2/2002 | Chontos | 33/339 |
| 6,484,412 | B1 | * | 11/2002 | Donaldson et al. | 33/414 |
| 6,915,587 | B1 | * | 7/2005 | Scillia et al. | 33/414 |

OTHER PUBLICATIONS

International Search Report issued in European Appl. No. 04257843.5, dated Jul. 13, 2007, 3 pages.

* cited by examiner

*Primary Examiner*—Christopher W Fulton
(74) *Attorney, Agent, or Firm*—Pillsbury Winthrop Shaw Pittman LLP

(57) ABSTRACT

A chalk line device includes a housing and a chalk line stored in the housing. The chalk line terminates in a hook at one end and the hook is disposed outside of the housing. The housing may include a side wall with a depression formed therein that is shaped to receive the hook for storage. The depression has an edge that allows the hook to securely engage. The housing may also include a translucent window for allowing the user to check the level of chalk in the chalk line device. The translucent window forms at least a portion of a wall of the housing. The translucent window can be made, for example, of a plastic and can be integrally formed with the housing.

53 Claims, 5 Drawing Sheets

CHALK LINE WITH VIEWING WINDOW

Matter enclosed in heavy brackets [ ] appears in the original patent but forms no part of this reissue specification; matter printed in italics indicates the additions made by reissue.

*This application is a reissue application of U.S. Pat. No. 6,915,587, which issued on Jul. 12, 2005.*

BACKGROUND OF THE INVENTION

1. Field of the Invention

The present invention pertains to chalk line devices, and more particularly, to chalk line devices with a housing having a viewing window and/or a housing having a structure for attaching an end of the chalk line.

2. Discussion of Related Art

Chalk line devices are widely employed to mark straight lines along a workpiece or work place. Generally, the chalk line device includes a housing or casing which defines a reservoir for storing chalk and stores an extendable line about a spool that is driven by a crank outside of the housing. Chalk line devices use a finely powdered chalk which is applied to the chalk line within the housing. The powdered chalk is usually colored brightly so as to allow the user to distinguish a mark line from a surface color of the workpiece. Generally, the housing is provided with a port for filling the reservoir initially with chalk or refilling the reservoir with chalk when the quantity of chalk in the reservoir is low. However, in conventional chalk line devices, it is difficult to determine the level of quantity of chalk remaining in the reservoir.

Furthermore, the chalk line typically terminates in a clip or a hook. The clip or hook facilitates pulling and securing the chalk line as well as acts as a stop against a wall of the housing to prevent the end of the chalk line from entering inside the housing during rewinding of the chalk line. However, in conventional chalk line devices, the clip is often left hanging and this may create the situation where the clip can get caught by some object or can be entangled with the line itself.

BRIEF SUMMARY OF THE INVENTION

An aspect of embodiments of the invention provides a chalk line device with storage for the hook end of the chalk line.

Another aspect of embodiments of the invention provides a chalk line device with a mechanism for determining the level of chalk in the device.

In accordance with an embodiment of the invention a chalk line device includes a housing having a chalk line port and a chalk port. The housing defines an exterior surface and an interior space including a chalk reservoir in communication with the chalk port. The chalk line device further includes a movable door secured to the housing over the chalk port to selectively open and close the chalk port and a chalk line support mounted in the interior space in the housing. A chalk line having one end secured to the chalk line support within the housing and another end with a hook disposed outside of the housing is provided. The chalk line extends through the chalk line port. A retracting mechanism is mounted to the housing and connected to the chalk line to selectively retract the chalk line into the housing and to allow the chalk line to be extended from the housing through the chalk line port. The exterior surface of the housing includes a side wall with a depression formed therein that is shaped to receive the hook for storage.

In accordance with an embodiment of the invention a chalk line device includes a housing having a chalk line port and a chalk port and defining an interior space including a chalk reservoir in communication with the chalk port. The housing includes a translucent window forming at least a portion of a wall of the chalk reservoir. The chalk line device further includes a chalk line support mounted in the interior space in the housing and a chalk line is secured to the chalk line support and extends through the chalk line port. A retracting mechanism is mounted to the housing and connected to the chalk line. The retracting mechanism selectively retracts the chalk line into the housing and allows the chalk line to be extended from the housing through the chalk line port.

These and other aspects of the invention will become apparent when taken with the detailed description and drawings.

DETAILED DESCRIPTION OF PREFERRED EMBODIMENTS OF THE INVENTION

Figure 1:
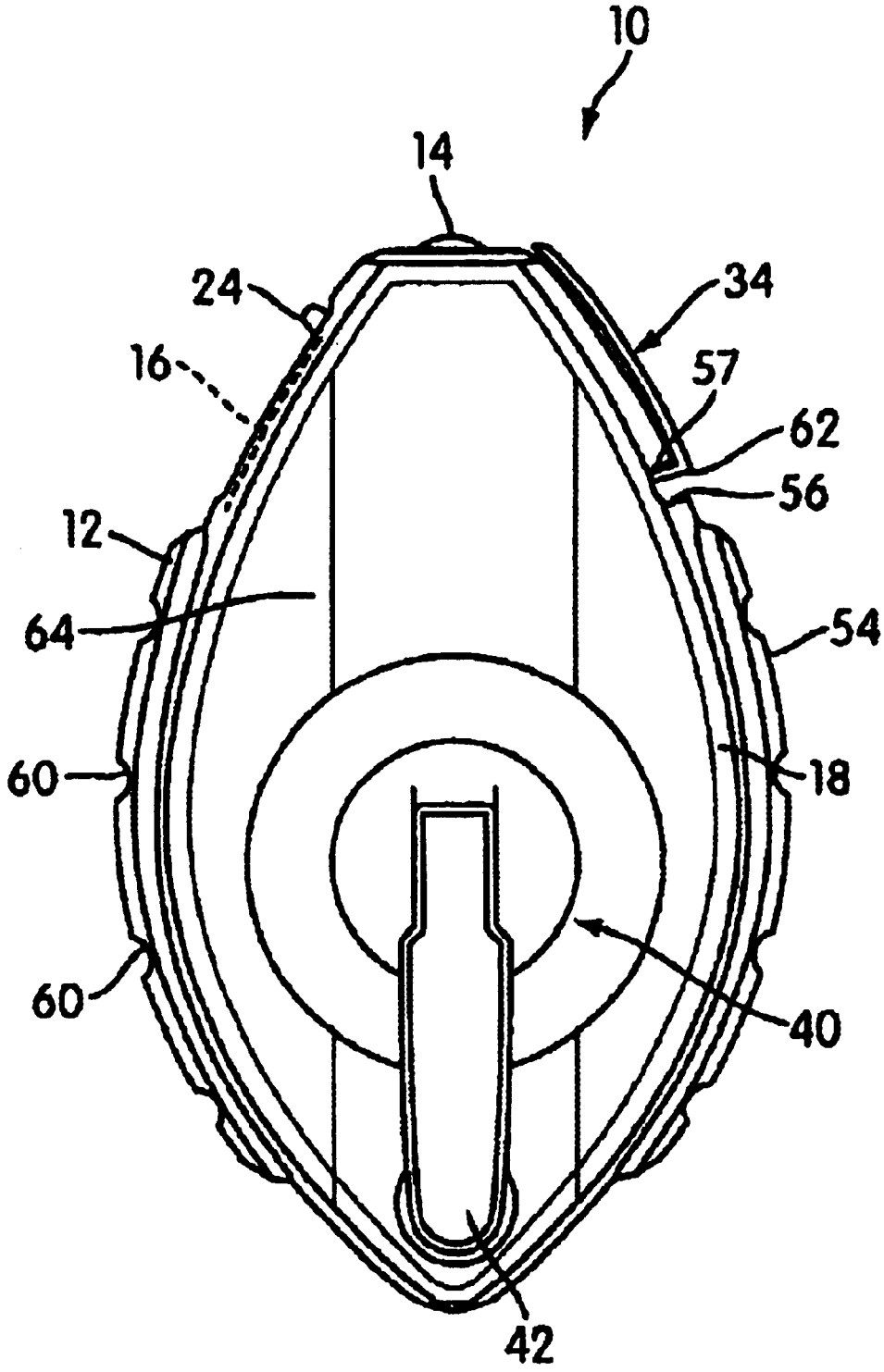
FIG. 1 is a front elevational view of a chalk line device according to an embodiment of the present invention.

Referring now to FIGS. 1–5 in detail, a chalk line device 10 is shown that includes a housing 12 having a chalk line port 14 and a chalk port 16. The housing 12 defines an exterior surface 18 and an interior space 20. The interior space 20 includes a chalk reservoir 22 in communication with the chalk port 16.

Figure 5:
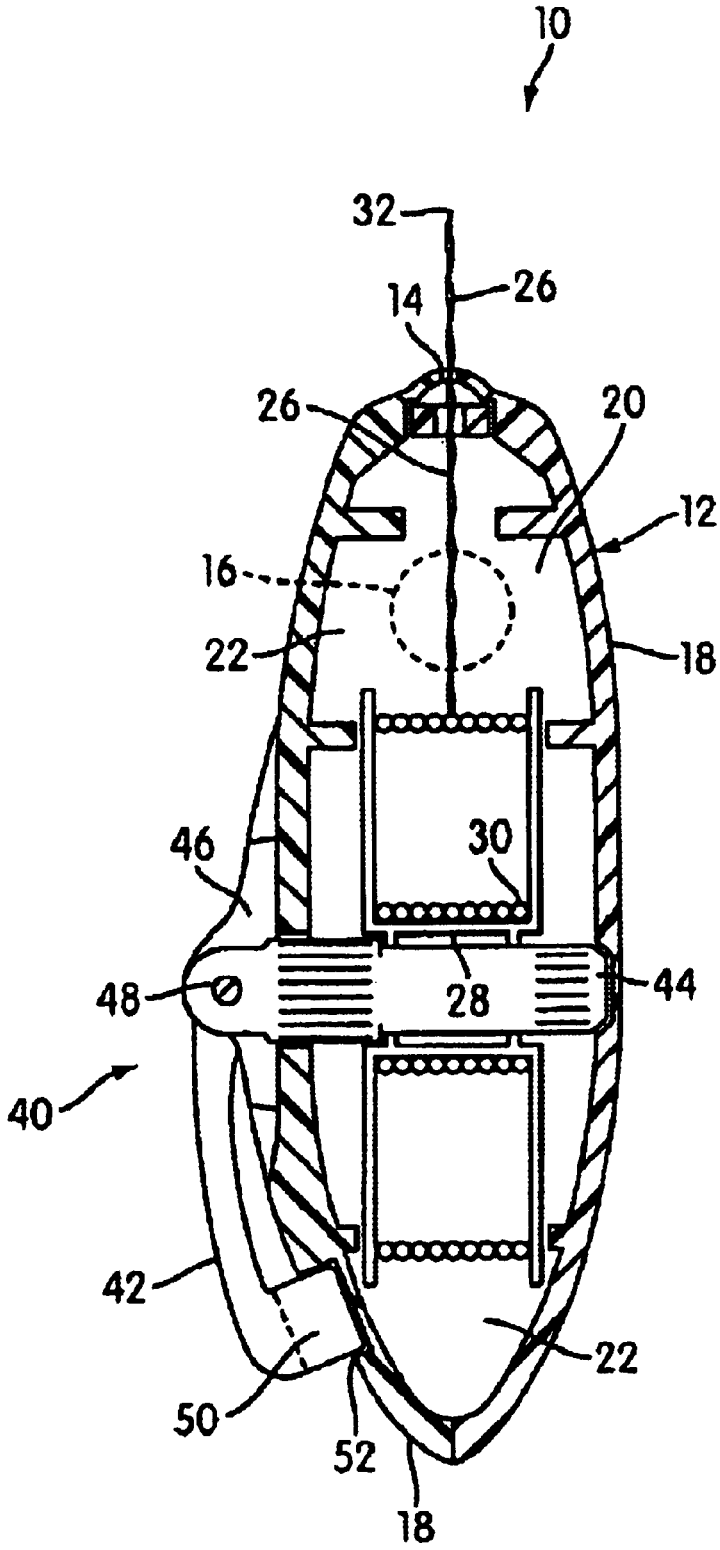
FIG. 5 is a cross-sectional view of a chalk line device according to an embodiment of the present invention.

A movable door 24 (shown in FIGS. 1 and 3) is secured to the housing 12 over the chalk port 16 to selectively open and close the chalk port 16. Any suitable closure mechanism may be used including a hinged door, a sliding door or even a self-sealing access port. As seen in FIG. 5, a chalk line 26 is spooled around a chalk line support 28. The chalk line support 28 is rotatably mounted in the interior space 20 in the housing 12.

The chalk line 26 has one end 30 secured to the chalk line support 28 within the housing 12 and another end 32 provided with a hook 34 disposed outside of the housing 12. The chalk line 26 extends through the chalk line port 14.

The chalk line device 10 further includes a retracting mechanism 40 which is mounted to the housing 12. The retracting mechanism comprises a handle 42, a crank shaft 44 and an integral hub 46.

The retracting mechanism 40 is connected to the chalk line support 28 via the crank shaft 44 and allows the chalk line 26 to be freely extended from the housing 12 through the chalk line port 14 when the user pulls the hook 34 attached to end 32 of chalk line 26. The retracting mechanism 40 also allows selective retraction of the chalk line 26 into the housing when the user rewinds the chalk line by rotating the handle 42. Of course any known retracting and spooling mechanisms could be used.

The handle 42 is connected to hub 46 via pivot pin 48. The handle 42 can easily be moved from a storing position through an are of about 180° to assume a cranking position as is known. The handle 42 has a knob 50 rotatably mounted on handle 42 to allow the user to rotate the handle 42 while being able to maintain grip on the knob 50. This feature facilitates rewinding of the chalk line. In addition, the knob 50 also serves as a rotating-stop for halting the rotation of the hub 46 and crank shaft 44 when the handle 42 is moved to a stored position. In the stored position, the knob 50 is inserted into a groove 52 provided in the exterior surface 18 of housing 12. In this way, the groove 52 serves as a rotating-stop and also renders the arm 42 more compact with the housing 12 for storage and/or handling.

Figure 2:
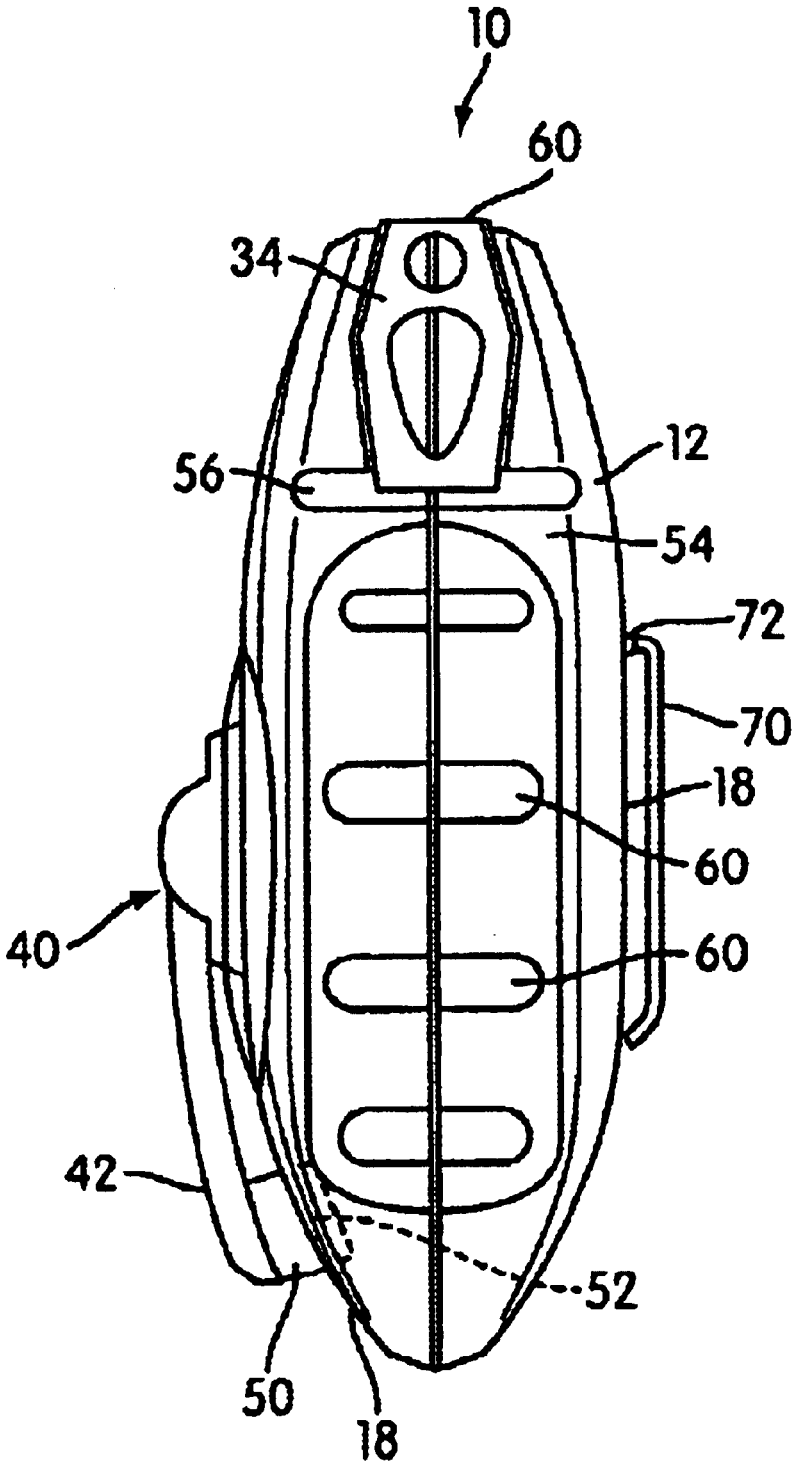
FIG. 2 is a side view of a chalk line device of FIG. 1 according to an embodiment of the present invention.

The exterior surface 18 of housing 12 also includes a side wall 54 with a depression 56 formed therein that is shaped to receive the hook 34 for storage, as seen in FIGS. 1–2. The depression 56 is formed as an elongated slot to allow easy insertion of the hook 34 as described below. The depression 56 is positioned adjacent to the chalk line port 14 so that when the line 26 is fully retracted in the housing 12, only the hook 34 remains on the exterior to prevent chalk from the line 26 from inadvertently soiling surfaces it may contact. So the depression 56 is preferably spaced from the port 14 about the length of the hook 34.

The depression 56 has an edge 57 (shown in FIG. 1) that allows the hook 62 to securely engage to prevent accidental removal. The edge 57 extends that an angle of about 90° or less from the surface 54 of housing 12 to form an acute ledge for the hook 34 to engage. The depression 56 has a mouth that is flush with the side wall 54.

Figure 3:
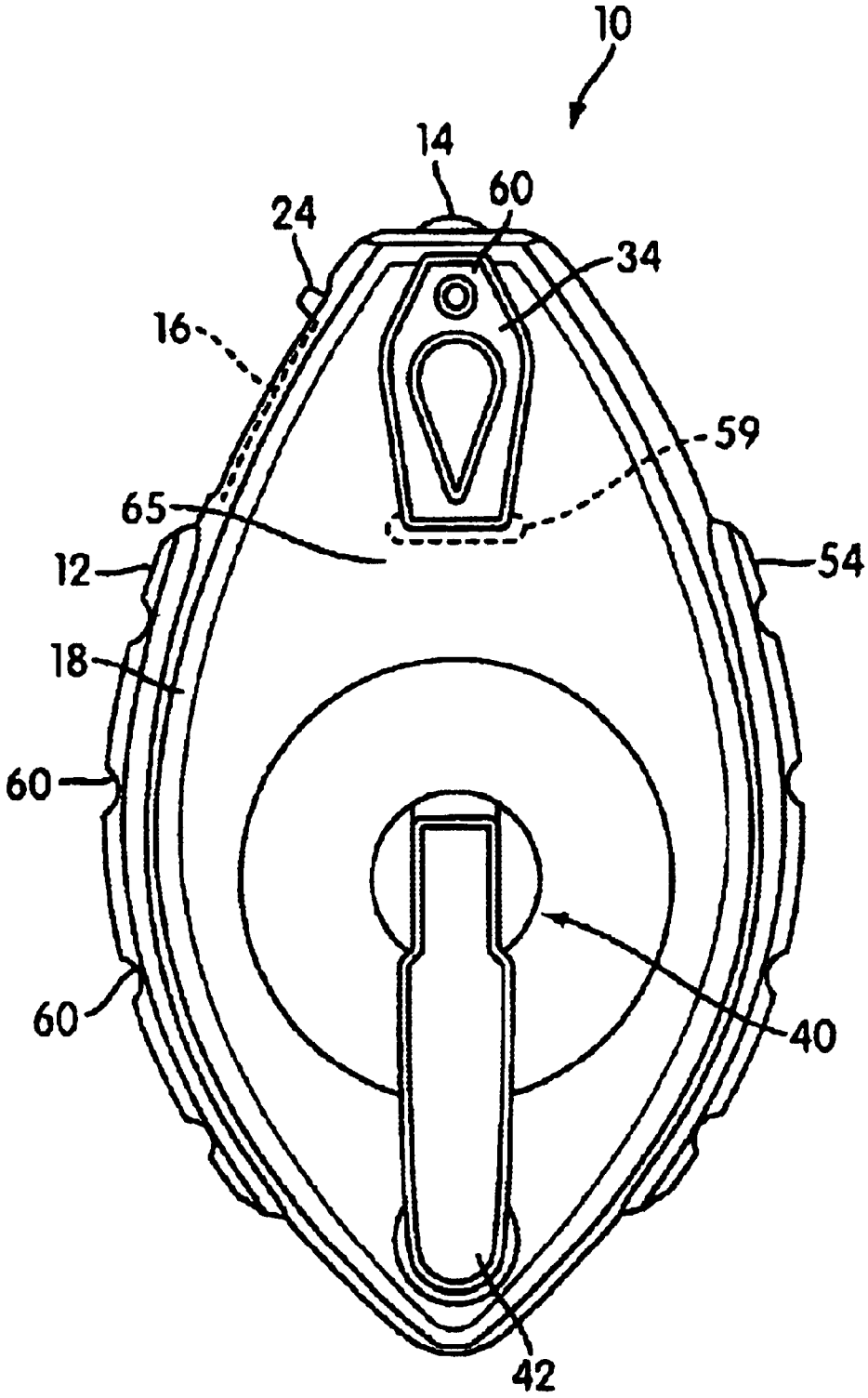
FIG. 3 is a front elevational view of a chalk line device according to another embodiment of the present invention.

The hook 34 has a body with a line attachment device 60 on one end and a finger 62 extending outwardly from the other end. The finger 62 engages the depression 56 during storage, as shown in FIGS. 1–3. The shape of the hook 34 can be designed such that the hook 34 can mate with a surface of side wall 54. For example, the shape of the hook can be curved to follow the curvature of side wall 54, as illustrated in FIG. 1. Of course, any known end piece for a chalk line can be used, including various shapes and configurations.

The movable chalk door 24 can be mounted on any surface of the housing 12. Similarly, the depression 56 can be formed on any surface of housing. For example, in the embodiment shown in FIGS. 1 and 2, the movable chalk door 24 is mounted to one side wall of the housing 12 and the depression is located on a different side of the housing 12. As seen in FIG. 2, the chalk door 24 is mounted on one side wall of the housing 12 and the depression 56 is located on a side wall situated on an opposite side of the housing 12. Whereas, in the embodiment shown in FIGS. 3 and 4, the chalk door 24 is mounted, for example, on one side wall of the housing and the depression 59 is located on a side wall that extends at an angle to the side wall with the chalk door 24. Alternatively, the chalk door 24 can be mounted on one side wall of the housing 12 and the depression 56 can be located on the same side wall, below the door 24 to cover the door 24 or at an end spaced apart from the door 24.

Figure 4:
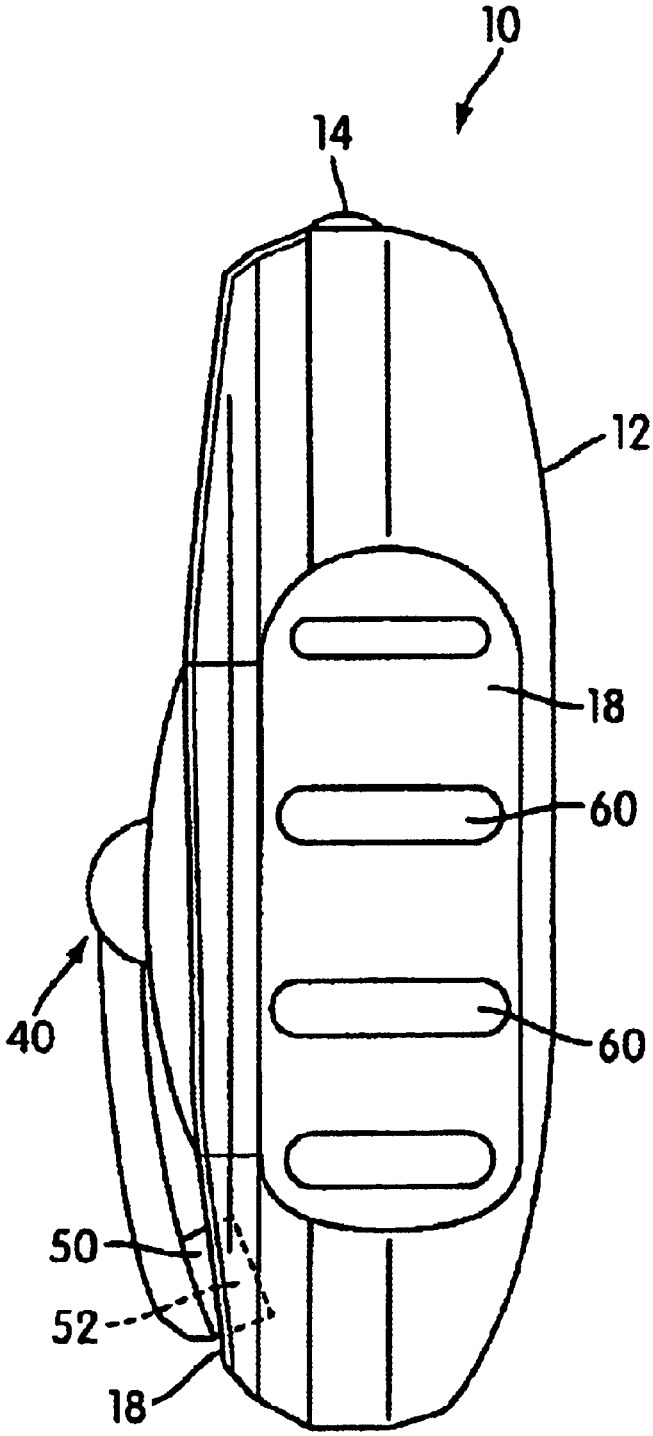
FIG. 4 is a side view of a chalk line device of FIG. 3 according to an embodiment of the present invention.

The side wall(s) 54 of housing 12 can be provided with a plurality of grip formations 60. As seen in FIGS. 2 and 4, the formations 60 are formed on the side wall to provide the user with a less slippery surface to grip and handle the chalk line device 10. Alternatively, the side wall(s) 54 of housing 12 can be provided with a plurality of ridges. In this case also, the ridges provide the user with a less slippery surface for better grip. However, any textured surface would be suitable for providing enhanced grip.

The housing 12 also includes a mechanism for determining the level of the chalk in the reservoir 22. As seen in FIGS. 1 and 3, the chalk line device 10 has a translucent window 64 (shown in FIG. 1) or window 65 (shown in FIG. 3). The window 64, 65 forms at least a portion of a wall of the chalk reservoir 22. The window 64, shown in FIG. 1, is a strip of translucent material covering one or more walls of the housing 12 over an entire length of the housing. The translucent window 65 shown in FIG. 3 forms a substantial portion of one side of the housing 12 and extends the length of the housing 12. However, one can appreciate that the translucent window 64, 65 can be formed on any selected surface portion of the housing 12 and have any size or shape. In addition, the translucent window can be formed on one or more sides of the housing 12.

The translucent window 64, 65 allows the user to check the level of chalk remaining in the reservoir 22. In one embodiment, the window 64, 65 is provided with a scale to indicate the level of chalk quantity in the reservoir. In another embodiment, the window 64, 65 can include a scale with three lines with the words (low, medium and high) written, respectively, beside each line to indicate to the user the approximate level of quantity of chalk in the reservoir. In yet another embodiment, the window 64, 65 can include a scale with four lines with the markings ¼, ½, ¾ and full inscribed, respectively, beside each line to indicate to the user the approximate level of quantity of chalk in the reservoir. However, one can appreciate that more than four lines may be inscribed on the window and used as a scale to indicate to the user the level of chalk in the reservoir.

The housing 12 is preferably formed of plastic but may also be formed of metal or any other suitable material or combination of materials. The translucent window 64, 65 is preferably formed of a light diffusing plastic, but may also be formed of glass or other translucent material. The window 64, 65 can be transparent, clear or colored, as long as a user can view the interior of reservoir 22. Thus, it should be understood that the term "translucent" as used herein should be construed as a generic term for materials that are clear (transparent) or light diffusing, so long as a viewer can determine the chalk level therethrough. The window 64, 65 can be integrally formed with the housing 12. The housing 12 may be formed as one piece or multiple pieces. In this case, the housing 12 can be over-molded with opaque material while leaving an area for the window 64, 65. For example, the housing 12 can be over-molded with a relatively soft material such as a soft plastic or rubber to protect the housing 12 from breaking in case the device 10 is dropped on a hard surface.

As stated above, the depression which receives the hook 34 for storage can be formed on any surface of housing 12. For example, as shown in FIG. 3, the depression 59 is formed on window 64. Similarly to the embodiment shown in FIGS. 1 and 2, the depression 59 is formed as an elongated slot to allow easy insertion of the hook 34. The hook 34 remains on the exterior to prevent chalk from the line 26 from inadvertently soiling surfaces it may contact. So the depression 59 is preferably spaced from the port 14 about the length of the hook 34.

The depression 59 has an edge that allows the hook 62 to securely engage to prevent accidental removal. Similarly to the embodiment shown in FIGS. 1 and 2, the edge extends at an angle of about 90° or less from the surface 54 of housing 12 to form an acute ledge for the hook 34 to engage. The depression 59 has a mouth that is flush with the surface of window 65.

As seen in FIG. 4, the depression may be enlarged to extend from the edge so as to receive the entire book 34 rather than just the finger 62. In this way, the hook 34 lies flush in the exterior surface 18 of the housing 12, as seen in FIG. 4. Of course, a depression similar to that shown in FIG. 1 could also be formed in the window 65 as well.

The chalk line device further optionally includes a clip 70 that is pivotally attached to a wall of housing 12 at point 72. The clip 70 can be spring biased at the point 72 to allow biasing the clip 70 toward a wall of the housing 12. The clip 70 can be used, for example, to hold the chalk line device 10 on a support. For instance, the clip 70 can be slid in a belt or on a pocket rim of a user to allow easy retrieval and storage.

Although the hook 34 is shown in the Figures having a certain shape or form, it is also within the scope of the present invention to have various shapes or form and make the hook from any material, such as but not limited to metal and plastic. The many features and advantages of the present invention are apparent from the detailed specification and thus, it is intended by the appended claims to cover all such features and advantages of the described apparatus which follow the true spirit and scope of the invention.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed:

1. A chalk line device, comprising:

a housing having a chalk line port and a chalk port, wherein the housing defines an exterior surface and an interior space including a chalk reservoir in communication with the chalk port;

a movable door secured to the housing over the chalk port to selectively open and close the chalk port;

a chalk line support mounted in the interior space in the housing;

a chalk line having one end secured to the chalk line support within the housing and another end with a hook disposed outside of the housing, wherein the chalk line extends through the chalk line port; and a retracting mechanism mounted to the housing and connected to the chalk line that selectively retracts the chalk line into the housing and allows the chalk line to be extended from the housing through the chalk line port;

wherein the exterior surface of the housing includes a side wall with a depression formed therein that is shaped to receive the hook for storage, the depression having a mouth that is flush with the side wall, wherein the hook has a body with a line attachment device on one end and a finger extending outwardly from the other end, the finger engaging the depression during storage so that the body can lie against the exterior surface.

2. The chalk line device of claim 1, wherein the door to the chalk port is mounted to one side of the housing and the depression is located on a different side of the housing.

3. The chalk line device of claim 1, wherein the housing has walls and the door is mounted on one wall of the housing and the depression is located on another wall that extends at an angle to the side wall with the door.

4. The chalk line device of claim 1, wherein the housing has walls and the door is mounted on one wall of the housing and the depression is located on a another wall that is located on an opposite side of the housing.

5. The chalk line device of claim 1, wherein the retracting mechanism includes a handle with a knob and the housing further includes another depression arranged to receive at least a portion of the knob when the handle is stored.

6. The chalk line device of claim 1, wherein the side wall has a plurality of grip depressions.

7. The chalk line device of claim 1, wherein the housing includes a translucent window.

8. The chalk line device of claim 7, wherein the housing has walls and the translucent window is located on a wall of the housing and the depression is located on another wall of the housing.

9. The chalk line device of claim 7, wherein the depression is formed on the translucent window.

10. The chalk line device of claim 1, wherein the depression has an edge.

11. The chalk line device of claim 10, wherein the edge forms an acute ledge.

12. The chalk line device of claim 1, wherein the depression is spaced from the chalk line port about a length of the hook.

13. A chalk line device, comprising:

a housing having a chalk line port and [a chalk port and] defining a sealed interior space including a chalk reservoir [in communication with the] *into which* chalk [port, wherein] *can be placed,* the housing [includes a translucent] *including a* window forming at least a portion of a wall of the chalk reservoir[; an amount of powdered chalk retained within the chalk reservoir], wherein [the] *an* amount of powdered chalk [retained] *that may be provided* within [the chalk] *said* reservoir can be viewed through the [translucent] window;

a chalk line support mounted in the interior space in the housing;

a chalk line [secured to] *carried by* the chalk line support and extending through the chalk line port; and a retracting mechanism mounted to the housing and connected to the chalk line [that], *the retracting mechanism operable to* selectively [retracts] *retract* the chalk line into the housing and [allows] *allow* the chalk line to be extended from the housing through the chalk line port.

14. The chalk line device of claim 13, wherein the [translucent] window forms substantially at least one side of the housing.

15. The chalk line device of claim 13, wherein an inside surface of the [translucent] window is polished to prevent chalk from sticking to the inside surface of the [translucent] window.

16. The chalk line device of claim 13, wherein the [translucent] window includes a scale to indicate a level of the chalk in the chalk reservoir.

17. The chalk line device of claim 16, wherein the scale includes three lines with words low, medium and high inscribed beside each respective line.

18. The chalk line device of claim 16, wherein the scale includes four lines with the markings ¼, ½, ¾ and full inscribed beside each respective line.

19. The chalk line device of claim 13, wherein the housing is formed of plastic and the window is formed of plastic.

20. The chalk line device of claim 13, wherein the housing is formed of metal and the window is formed of plastic.

21. The chalk line device of claim 20, wherein the housing and the window are integrally formed.

22. The chalk line device of claim 21, wherein the housing is over-molded with opaque material.

23. The chalk line device of claim 22, wherein the over-molded opaque material is one of a plastic and rubber.

24. The chalk line device of claim 23, wherein the plastic is a soft plastic.

25. The chalk line device of claim 13, wherein the [translucent] window is textured with varying textures to highlight a viewing zone for viewing a level of the chalk in the chalk reservoir.

26. The chalk line device of claim 13, wherein the window is transparent.

27. The chalk line device of claim 13, wherein the [translucent] window comprises a transparent zone and a light diffusing zone.

28. The chalk line device of claim 13, wherein the window is arranged to cover substantially a whole length of a face of the housing.

29. The chalk line device of claim 13, wherein the housing has a depression that retains an end of the chalk line.

30. The chalk line device of claim 29, wherein the chalk line has a hook and the depression is shaped to engage the hook.

31. The chalk line device of claim 29, wherein the housing has walls and the depression is located on one wall of the housing and the window is located on another wall of the housing.

32. The chalk line device of claim 29, wherein the depression is formed on the window.

33. A chalk line device, comprising:

a housing having a chalk line port and a chalk port, wherein the housing defines an exterior surface and an interior space including a chalk reservoir in communication with the chalk port;

a movable door secured to the housing over the chalk port to selectively open and close the chalk port;

a chalk line support mounted in the interior space in the housing;

a chalk line having one end secured to the chalk line support within the housing and another end with a hook disposed outside of the housing, wherein the chalk line extends through the chalk line port; and a retracting mechanism mounted to the housing and connected to the chalk line that selectively retracts the chalk line into the housing and allows the chalk line to be extended from the housing through the chalk line port;

wherein the exterior surface of the housing includes a side wall with a depression formed therein that is shaped to receive the hook for storage, [and the housing includes a translucent window forming at least a portion of a wall of the chalk reservoir,] the depression having a mouth that is flush with the side wall.

34. The chalk line device of claim 33, wherein the housing has walls and the depression and [the window] *a window* are formed on a same wall of the housing.

35. The chalk line device of claim 34, wherein the depression is formed in the window.

36. The chalk line device of claim 33, wherein the housing has walls and the depression and [the window] *a window* are formed on different walls.

37. The chalk line device of claim 33, wherein the depression is spaced from the chalk line port about a length of the hook.

38. The chalk line device of claim 33, wherein the depression has an edge and the hook has a finger that engages the edge.

39. The chalk line device of claim 38, wherein the edge forms an acute ledge.

40. The chalk line device of claim 33, wherein [the window] *a window* forms substantially one side of the housing.

41. The chalk line device of claim 33, wherein [the window] *a window* is arranged to cover substantially an entire length of one side of the housing.

42. The chalk line device of claim 33, wherein an inside surface of [the translucent window] *a window* is polished to prevent chalk from sticking to the inside surface of the [translucent] window.

43. The chalk line device of claim 33, wherein [the translucent window] *a window* includes a scale to indicate a level of chalk quantity in the chalk reservoir.

44. The chalk line device of claim 43, wherein the scale includes three lines with words low, medium and high inscribed beside each respective line.

45. The chalk line device of claim 43, wherein the scale includes four lines with the markings ¼, ½, ¾ and full inscribed beside each respective line.

46. The device of claim 33, wherein [the translucent window] *a window* is textured with varying textures to highlight a viewing zone for viewing a level of chalk in the chalk reservoir.

*47. The chalk line device of claim 13, wherein the window is translucent.*

*48. The chalk line device of claim 13, further comprising a movable door to provide access through a port into the space, wherein chalk can be placed into the sealed interior space by opening the movable door.*

*49. A chalk line device, comprising:*

*a housing having a chalk line port and defining a sealed interior space including a chalk reservoir into which chalk can be placed, the housing including a window through which an amount of powdered chalk that may be placed within said reservoir can be viewed;*

*a chalk line support mounted in the housing;*

*a chalk line carried by the chalk line support and extendable through the chalk line port; and*

*a retractor mechanism carried by the housing and operatively coupled with the chalk line to enable the retractor mechanism to retract the chalk line into the housing and to allow the chalk line to be extended from the housing through the chalk line port.*

*50. The device of claim 49, wherein the window forms at least a portion of a side wall of the housing.*

*51. The device of claim 49, wherein the retracting mechanism comprises a handle.*

*52. The device of claim 49, wherein the chalk line support comprises a spool.*

*53. The device of claim 49, wherein the window is formed from a transparent material.*

* * * * *